US006383602B1

(12) United States Patent
Fric et al.

(10) Patent No.: US 6,383,602 B1
(45) Date of Patent: May 7, 2002

(54) METHOD FOR IMPROVING THE COOLING EFFECTIVENESS OF A GASEOUS COOLANT STREAM WHICH FLOWS THROUGH A SUBSTRATE, AND RELATED ARTICLES OF MANUFACTURE

(75) Inventors: Thomas Frank Fric, Schenectady; Robert Patrick Campbell, Loudonville, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/285,966

(22) Filed: Apr. 5, 1999

Related U.S. Application Data

(63) Continuation-in-part of application No. 08/773,466, filed on Dec. 23, 1996, now abandoned.

(51) Int. Cl.$^7$ ............................. F01D 5/08; B32B 3/24
(52) U.S. Cl. .................. 428/131; 428/137; 416/97 R; 416/97 A; 60/755; 415/115; 427/454; 427/142; 427/156; 427/282; 427/287
(58) Field of Search ................. 428/137, 131; 416/97 R, 97 A; 60/755; 415/115; 427/454, 142, 156, 282, 287

(56) References Cited

U.S. PATENT DOCUMENTS

| 5,039,562 A | 8/1991 | Liang .................. 427/276 |
| 5,223,320 A | 6/1993 | Richardson .............. 428/137 |
| 5,503,529 A | 4/1996 | Anselmi et al. ......... 416/97 R |
| 5,902,647 A | * 5/1999 | Venkataramani et al. ... 427/454 |

FOREIGN PATENT DOCUMENTS

| EP | 466501 A2 | 1/1992 |
| EP | 677644 A1 | 10/1995 |
| GB | 2127105 | 4/1984 |
| JP | 60-32903 | * 2/1985 |

OTHER PUBLICATIONS

"The Flow and film Cooling Effectiveness Following Injection Through a Row of Holes", by N. W. Foster et al., Transactions of the ASME, vol. 102, pp. 584–588 (Jul. 1980).

"Effects of Hole Geometry and Density on Three–Dimensional Film Cooling", by R.J. Goldstein et al., Int. J. Heat Mass Transfer, vol. 17, pp. 595–606 (1974).

"Film Cooling with Compound Angle Holes: Adiabatic Effectiveness", by Donald L. Schmidt et al., Mechanical Engineering Dept., University of Texas at Austin, presented at the International Gas Turbine and Aeroengine Congress and Exposition, the Hague, Netherlands (Jun. 13–16, 1994), pp. 1–8.

(List continued on next page.)

Primary Examiner—William P. Watkins, III
(74) Attorney, Agent, or Firm—Noreen C. Johnson; Christian G. Cabou

(57) ABSTRACT

A method for improving the cooling effectiveness of a gaseous coolant stream which flows through at least one passage hole in a substrate to an exit site on a high-temperature surface of the substrate is disclosed. The method comprises disrupting the coolant stream at the exit site, so that the coolant stream contacts a greater area of the high-temperature surface. In some embodiments, the exit site is a crater. Moreover, the exit site may be formed within a coating applied over the substrate, e.g., a thermal barrier coating applied over a superalloy substrate.

Related articles are also disclosed.

48 Claims, 8 Drawing Sheets

OTHER PUBLICATIONS

"Flowfield Measurements for Film–Cooling Holes with Expanded Exits", by K. Thole et al., Institut fur Thermische Stromugsmaschinen, Universitat Karlsruhe, Karlsruhe, Germany, presented at the International Gas Turbine and Aeroengine Congress and Exposition, Birmingham, UK, (Jun. 10–13, 1996) pp. 1–10.

"Transonic Film–Cooling Investigations: Effects of Hole Shapes and Orientations", by S. Wittig et al., Lehrstuhl und Institut fur Thermische Stromungsmaschinen, Universitat Karlsruhe (T.H.), 76128 karlsruhe, Germany, presented at the International Gas Turbine and Aeroengine Congress and Exposition, pp. 1–11.

Patent Abstract of Japan, Publication 60032903, Date Feb. 20, 1985.

European Search Report For EP97310305.

* cited by examiner

METHOD FOR IMPROVING THE COOLING EFFECTIVENESS OF A GASEOUS COOLANT STREAM WHICH FLOWS THROUGH A SUBSTRATE, AND RELATED ARTICLES OF MANUFACTURE

This application is a C.I.P. of 08/773,466, filed Dec. 23, 1996, 08/773,466 now abandoned.

TECHNICAL FIELD

This invention relates generally to articles which are used in a high-temperature environment. More particularly, it relates to methods for protecting the articles from damage in such an environment.

BACKGROUND OF THE INVENTION

Various types of materials, such as metals and ceramics, are used for components which may be exposed to a high-temperature environment. Aircraft engine parts represent examples of these types of components. Peak gas temperatures present in the turbine engine of an aircraft are maintained as high as possible for operating efficiency. Turbine blades and other elements of the engine are usually made of metal alloys which can resist the high-temperature environment, e.g., superalloys, which have an operating temperature limit of about 1000° C.–150° C. Operation above these temperatures may cause the various turbine elements to fail and damage the engine.

A variety of approaches have therefore been used to raise the operating temperature of the components—especially, metal components. For example, one approach involves the use of protective coatings on the surfaces of the components. The coatings are usually ceramic-based, and are sometimes referred to as thermal barrier coatings or "TBC"s.

Another approach (which may be used in conjunction with the TBC's) calls for the incorporation of internal cooling :channels in the metal component, through which cool air is forced during engine operation. As an example, a pattern of cooling holes may extend from a relatively cool surface of a combustion chamber to a "hot" surface which is exposed to gas flow at combustion temperatures of at least about 10000° C. (The drawings described below will serve to illustrate this concept.) The technique is sometimes referred to as "discrete hole film cooling". Cooling air, usually bled off from the engine's compressor, is typically bypassed around the engine's combustion zone and fed through the cooling holes to the hot surface. The ratio of the cooling air mass flux (the product of air velocity times density) to the mass flux of the hot gas flowing along the hot surface (e.g., a combustion product) is sometimes referred to as the "blowing ratio". The cooling air forms a protective "film" between the metal surface and the hot gas flow, preventing melting or other degradation of the component.

Film cooling performance may be characterized in several ways. One relevant indication of performance is known as the adiabatic wall film cooling effectiveness, sometimes referred to herein as the "cooling effectiveness". This particular parameter is equivalent to the concentration of film cooling fluid at the surface being cooled. In general, the greater the cooling effectiveness, the more efficiently can the surface be cooled.

Under certain conditions, the cooling stream moving through a passageway in a substrate and out to the hot surface tends to separate from the hot surface quickly, rather than moving along the surface and being in close contact therewith. This separation can seriously diminish the cooling effectiveness and lead to temperature-related damage to the part. This is often the case with aircraft engine components, such as combustor liners, where the blowing ratio is usually greater than about 1, and often in the range of about 2 to about 6.

A reduction in the blowing ratio, e.g., to a preferable value less than 1, might help to prevent the cooling stream from separating from the surface. However, for most combustors, the velocity of the cooling stream is determined in large part by the pressure drop across the combustor liner, and the turbine designer is usually not able to significantly alter the blowing ratio without changing other critical parameters in the engine design. Moreover, the use of greater amounts of cooling air to try to maintain a certain cooling capacity diverts air away from the combustion zone. This can lead to other problems, such as greater air pollution resulting from non-ideal combustion, and less efficient engine operation.

One can readily understand that new methods for increasing the cooling effectiveness provided by a discrete hole film cooling system would be welcome in the art. The methods should be especially applicable to parts exposed to very high operating temperatures, such as metal-based turbine engine parts. Moreover, the discovered techniques should not interfere with other functions, e.g., the efficient operation of a turbine engine, or the strength and integrity of turbine engine parts. The methods should also be compatible with other protective systems which may be used simultaneously, such as thermal barrier coating systems. Finally, the implementation of these methods should preferably not involve bstantial cost increase in the manufacture or use of the relevant component, or of a system in which the component operates.

SUMMARY OF THE INVENTION

The needs discussed above have been met by the discoveries outlined herein. One embodiment of this invention is directed to a method for improving the cooling effectiveness of a gaseous coolant stream which flows through at least one passage hole in a substrate to an exit site on a high-temperature surface of the substrate. The method comprises disrupting the coolant stream at the exit site, so that the coolant stream contacts a greater area of the high-temperature surface. In many embodiments, this invention allows an increase in the concentration of gaseous coolant at the high-temperature surface by a multiplicative factor of at least about 1.1, as compared to a conventional coolant stream, and often, by a multiplicative factor of at least about 1.5.

In preferred embodiments, the exit site is a crater. Moreover, the exit site may be formed within a coating applied over the substrate, such as a thermal barrier coating.

Another embodiment of the present invention is directed to an article which comprises a substrate and at least one passage hole for a coolant stream extending through the substrate from a first surface to an exit site at a second surface which is selectively exposed to high temperature. The passage hole has a substantially uniform cross-sectional area within the substrate, but has a different cross-sectional area at the exit site, suitable for disrupting the flow of the coolant stream. The exit site may be in the shape of a crater, as discussed below. Moreover, the exit site may be located in a coating situated on top of the substrate.

One example of an article based on embodiments of the present invention is a metal-based component of a turbine engine, such as a combustor. As demonstrated below, this invention significantly increases the cooling effectiveness of a coolant stream typically employed to protect turbine engine components from excessive exposure to high temperature.

DETAILED DESCRIPTION OF THE INVENTION

The substrate can be any material which is exposed to high temperatures and requires cooling. Examples include ceramics or metal-based materials. "Metal-based" refers to substrates which are primarily formed of a single metal or metal alloys, but which may also include some non-metallic components, e.g., ceramics, intermetallic phases, or intermediate phases. Non-limiting examples of metals related to this invention are steel, aluminum refractory metals such titanium; and superalloys, such as those based on nickel.

The cooling holes which are in the substrate extend from one surface to another surface, and may constitute a variety of shapes. Usually, they extend from a surface which does not require significant cooling to a "high-temperature surface" which does require cooling. The temperature for the latter surface of course depends on the end use of the substrate. In the case of turbine engines, though, the surface is typically exposed to gas temperatures of at least about 700° C., and more often, at least about 1000° C. For the sake of discussion, the high-temperature surface will sometimes be referred to herein as the "hot surface", while the surface at which the cooling passage hole originates will be referred to as the "cold surface."

Figure 1:
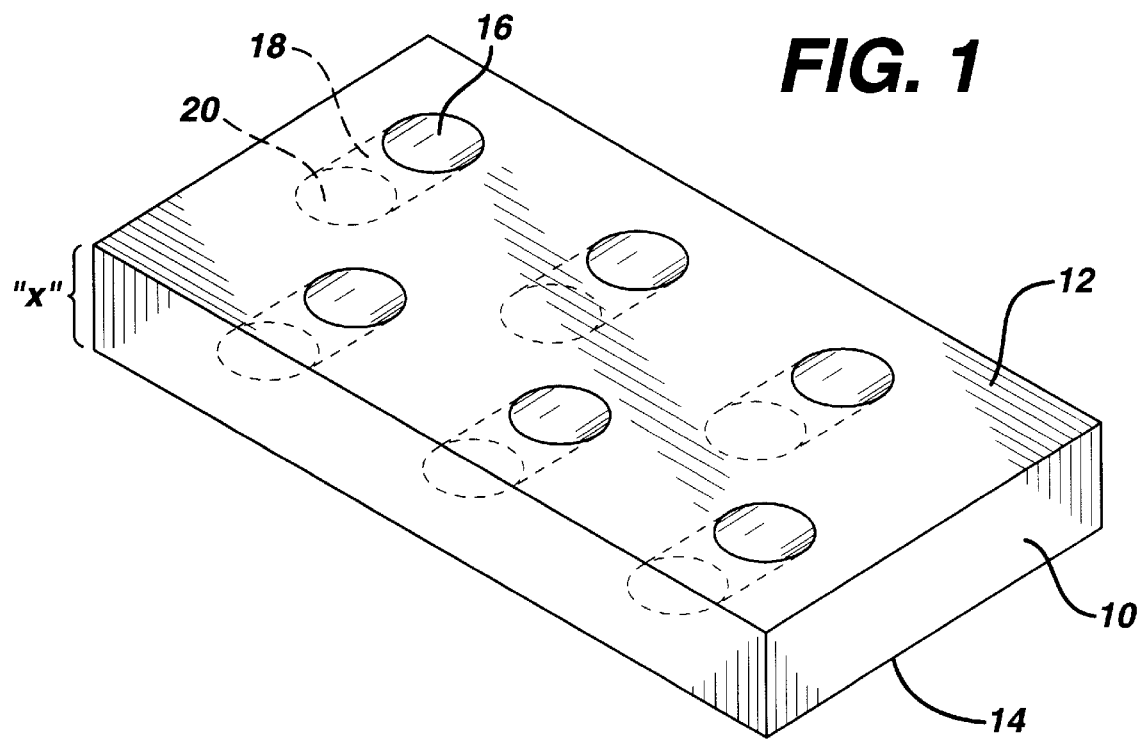
FIG. 1 is a top view of a substrate which includes an array of cooling holes.

An exemplary substrate 10 is depicted in FIG. 1. Surface 12 is arbitrarily designated as the hot surface, while surface 14 is designated as the cold surface. Passage holes 16 extend throughout hole length section 18 (shown in phantom), exiting from the cold surface at hole bottom 20 (also shown in phantom).

The distance between the hot surface and the cold surface is usually equivalent to the thickness of the substrate, and is designated as dimension "x" in FIG. 1. This distance is usually in the range of about 20 mils to about 2000 mils, and most often, in the range of about 50 mils to about 200 mils. Very often—especially when used as cooling passageways in some sort of engine part—most of the holes are substantially round, thus having a cylindrical shape through the body of the substrate. The average diameter of the holes is typically in the range of about 10 mils to about 100 mils. In some embodiments, the diameter is in the range of about 15 mils to about 50 mils. The holes are usually situated at an angle, e.g., inclined at an angle of at least about 10 degrees to about 60 degrees, relative to the horizontal surface of the substrate. More often (especially when they are situated in an engine part such as a combustor liner), the angle is in the range of about 20 degrees to about 45 degrees. The particular angle of the holes is of course determined by the shape of the component; its cooling requirements; and empirical observations (and/or computer-modeling results) of air flow patterns through and across sample substrates. The present invention is thought to be applicable for the fill range of hole inclination stated above.

The depth of the passage hole (i.e., the "length" of a hole when it is situated at an angle) is usually in the range of about 20 mils to about 4000 mils. This range takes into account the relevant dimension of the exit site, discussed below. Typically, there are about 5 to about 200 holes per square-inch of the outer surface. In the case of an engine part such as a turbine combustion chamber, the density is usually about 40 to about 80 holes per square-inch.

It should be understood that the present invention is directed to any number of passage holes. For example, it can be used to improve the cooling effectiveness of a large array of holes (as found in a combustor liner); a row of holes; any random pattern or group of holes, or a single hole.

Figure 2:
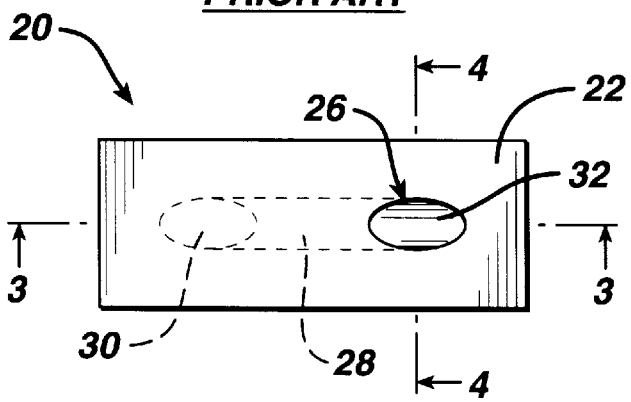
FIG. 2 is a top view of a substrate which includes one cooling hole based on the prior art.

To facilitate discussion, FIG. 2 depicts a single passage hole 26 of the prior art. The top view depicts a hot surface 22 of substrate 20. In practice, the coolant stream would enter the hole at an entry site 30 (shown in phantom), and travel through hole length section 28, exiting at exit site 32. The area of the opening at the exit site will sometimes be referred to herein as the "penetration area", i.e., the planar area of the opening as viewed in a direction perpendicular to the surface. For a typical passage hole geometry of the prior art, the area of the opening at the exit site and the penetration area will be identical, since the geometry of the passage hole has not been altered. Thus, in FIG. 2, the penetration area would be the area of element 32.

Figure 3:
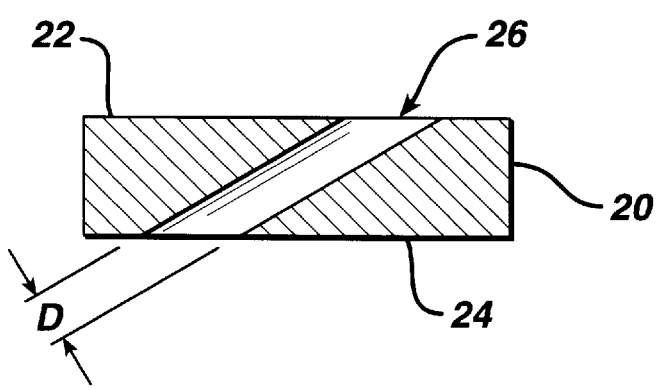
FIG. 3 is an elevational cross-section of the substrate of FIG. 2, taken through lines 3—3.
Figure 4:
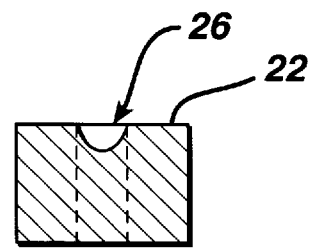
FIG. 4 represents another cross-section of FIG. 2, taken through lines 4—4.

The cross-sectional view of FIG. 3 shows the typical inclination of a passage hole (which originates at cold surface 24, and has a diameter "D") in a turbine engine component, although the inclination can vary substantially, as discussed previously. FIG. 4 is another cross-sectional view which shows the typical shape of hole 26 at surface 22.

For maximum cooling effectiveness, it's desirable that the exiting coolant stream remain in contact with as much of hot surface 22 as possible. However, if stream sometimes has a tendency to separate from the surface immediately—especially under the high blowing ratios mentioned above, and at high inclination angles for the passage holes, e.g., greater than about 30 degrees relative to the horizontal surface of the substrate. If the concentration of coolant at the surface is insufficient, the part may become damaged due to excessive temperature-exposure.

FIGS. 5–8 represent one embodiment of the present invention, in which the coolant stream has been disrupted. In this particular embodiment, the exit site of hole 46 at hot surface 42 has been modified. As used herein, the "exit site" is defined as the portion of the passage hole which borders the hot surface, and can be in the form of a crater, depression, or cavity, for example. The exit site can be described with two parameters. First, the depth of this portion of the pas hole usually constitutes about 10% to about 500% of the hole diameter, and in preferred embodiments, is about 20% to about 100% of the hole diameter. Second, the planar area of the exit site (element 51 for FIG. 5, described below) is usually in the range of about 50% to about 600% of the penetration area (element 52) of the unchanged portion of the hole. In preferred embodiments, the planar area of the exit site is usually in the range of about 200% to about 400% of the penetration area.

As alluded to earlier, the present invention is based in large part on the unexpected discovery that a rather sudden disruption of the flow of coolant results in the coolant stream contacting a greater area of the hot surface, leading to greater cooling effectiveness. In the embodiment of FIGS. 5–8, the disruption is effected by maintaining a substantially uniform cross-sectional area for passage hole 46 (having a diameter "D") through the bulk of substrate 40, but enlarging the cross-sectional area of the passage hole at exit site 51. As shown in FIGS. 6 and 7, the exit site can be in the form of a crater, having a depth ("d"), and a sidewall 56 (substantially cylindrical in this embodiment) which is substantially vertical to the substrate surface. The central portion of the bottom of the crater opens into passage hole length section 48, continuing onto the cold surface (not shown). The required size of the modified section of the hole (i.e., the crater) relative to the remainder of the hole (i.e., the unchanged section) is not certain, since it appears that any enlargement, according to the dimensions set forth above, may be beneficial in providing a source of disruption to the coolant flow. For coolant holes in a typical engine component such as a combustor liner, the depth of the crater would usually be about 5 mils to about 100 mils, and preferably, about 10 mils to about 30 mils. As those of skill in the art understand, the passage hole itself can be prepared by a variety of techniques, such as laser drilling. A crater like that depicted in the FIGS. 4–7 could also be formed by various well-known techniques, e.g., conventional machining, electrical discharge machining, or water jet drilling.

In preferred embodiments of this invention, it is important that the exit site, e.g., the crater, have a depth which is less than the length of the passage hole. In more preferred embodiments, the depth should be less than about 50% of the length of the passage hole. In some especially preferred embodiments, the exit site has a depth which is less than about 35% of the length of the passage hole. The shallow depth of the exit site, relative to the length of the passage hole, tends to readily allow the coolant stream to move at its full force through the hole until it hits the obstruction. Such a disruption in coolant flow provides the advantages discussed herein.

Moreover, in many preferred embodiments of the invention, the axis (or centerline) of the passage hole is out of alignment with the axis of the exit site. This intended misalignment provides the desired type of disruption for the coolant flow, as opposed to simply diffusing the coolant flow, or merely directing the flow in a slightly different direction. The misalignment is often substantial.

Figure 15:
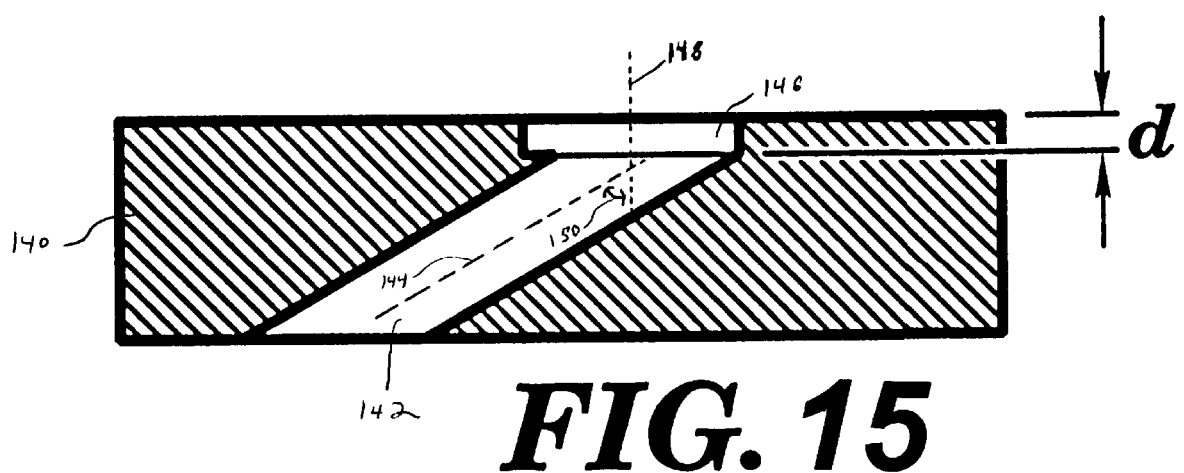
FIG. 15 is an elevational cross-section of the substrate of FIG. 5, taken through lines 6—6.

FIG. 15, which is a substantially identical enlargement of FIG. 6, provides a helpful illustration regarding the relative, misaligned positions of the passage hole and an exit site, here in the form of a crater. Substrate 140 includes passage hole 142, which contains axis 144 through its approximate center (lengthwise). The passage hole terminates at crater 146, which contains axis 148 through the approximate center or depth of its length, i.e., its depth "d". The angle 150 between passage hole axis 144 and a lower extension of crater axis 148 is preferably at least about 20 degrees, and more preferably, at least about 30 degrees.

Figure 5:
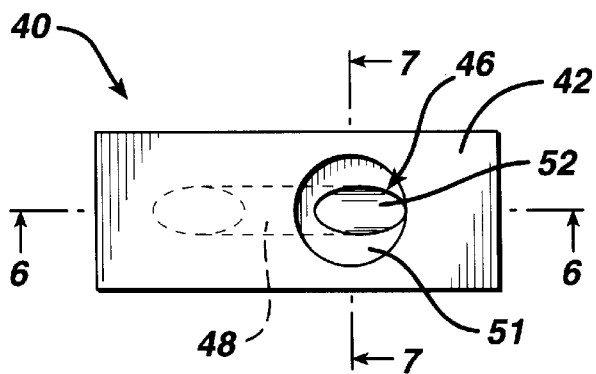
FIG. 5 is a top view of a substrate which includes a modified cooling hole according to the present invention.
Figure 6:
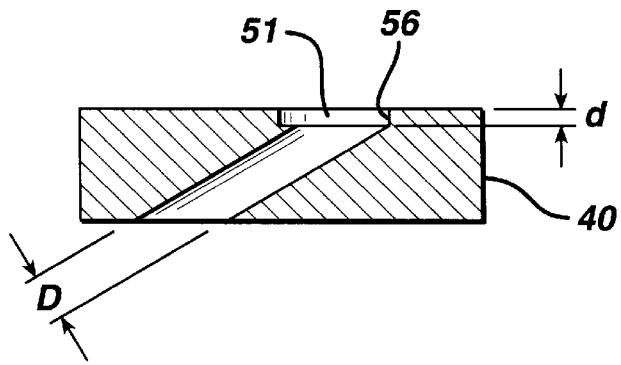
FIG. 6 is an elevational cross-section of the substrate of FIG. 5, taken through lines 6—6.
Figure 7:
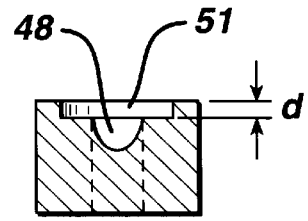
FIG. 7 represents another cross-section of FIG. 5, taken through lines 7—7.
Figure 8:
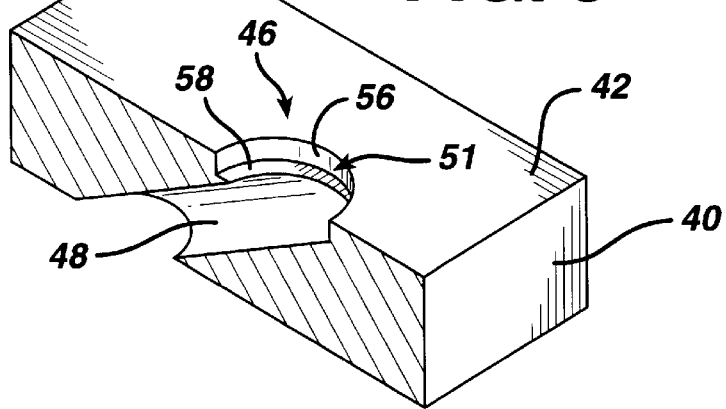
FIG. 8 is another, partial cross-sectional view of a portion of the modified cooling hole depicted in FIGS. 4–6.

FIG. 8 is another cross-sectional view of a portion of the modified passage hole 46 depicted in FIGS. 5–7. Hole length section 48 terminates at the rounded-crater 51 which serves as the exit site. A horizontal ledge 58 (which need not be present in all embodiments) is situated at the junction of hole section 48 with sidewall 56. As mentioned above, the disruption in coolant flow caused by the crater surprisingly results in the passing coolant stream remaining in contact with a greater portion of hot surface 42.

It should be understood that in some embodiments, sidewall 56 need not be substantially perpendicular to surface 42. In other words, it is believed that the sidewall could be inclined in one direction or the other relative to the perpendicular position. For example, the angle of the sidewall relative to surface 42 (or to horizontal ledge 58) could be as low as about 30 degrees, and as high as about 120 degrees. Based on the teachings presented herein, those skilled in the art can perform simulated or actual flow tests to determine the effect of a particular angle of inclination on coolant flow relative to surface 42.

Moreover, the sidewall does not have to be flat or smooth in some embodiments. For example, when the sidewall of an exit site is formed within a coating layer after removal of a masking material from a passage hole and the surrounding area, the sidewall surface may be fairly irregular. The embodiment illustrated by FIG. 11 and discussed below usually includes this characteristic for the sidewall surface.

Formation of an exit site in a substrate for the present invention can be carried out by a variety of processes, e.g., typical metal-working procedures for a metal-based substrate. Drilling, shaping, and machining techniques could be utilized to shape the holes according to specification. For an array of holes, these processes would sometimes be carried out with the aid of a computer, e.g., by a robotic system.

In some embodiments, the desired exit geometry of the hole could be obtained by placing a cover plate on the high-temperature surface of the substrate. The cover plate would have a lower surface planar with the substrate surface, i.e., adapted for attachment thereto. It would contain holes aligned with the passage holes in the substrate, having the dimensions of the desired exit site. In most embodiments, the thickness of the plate would be substantially equal to the depth of the exit site. The plate could be attached to the substrate by any technique appropriate for the end use of the substrate. Mechanical means such as bolting, welding, brazing, diffusion bonding, and the like, could be used in some instances, while an adhesive right be used in other embodiments. The resulting article would be similar m structure to that of FIGS. 6–8. The article would also be similar to that of FIGS. 9 and 10 (discussed below), if one were to view top layer 64 as a cover plate.

In another embodiment of the present invention, the exit site can be formed by the application of a layer of material on top of the high temperature surface of the substrate. Usually, the material is one suitable for use at high temperature, such as the TBC coating described previously. It is often ceramic-based. In some embodiments, though, this top-layer material could be a synthetic polymer, such as an epoxy resin or a phenolic. These embodiments would be suitable for lower-temperature end uses, e.g., below about 400° C.

Figure 9:
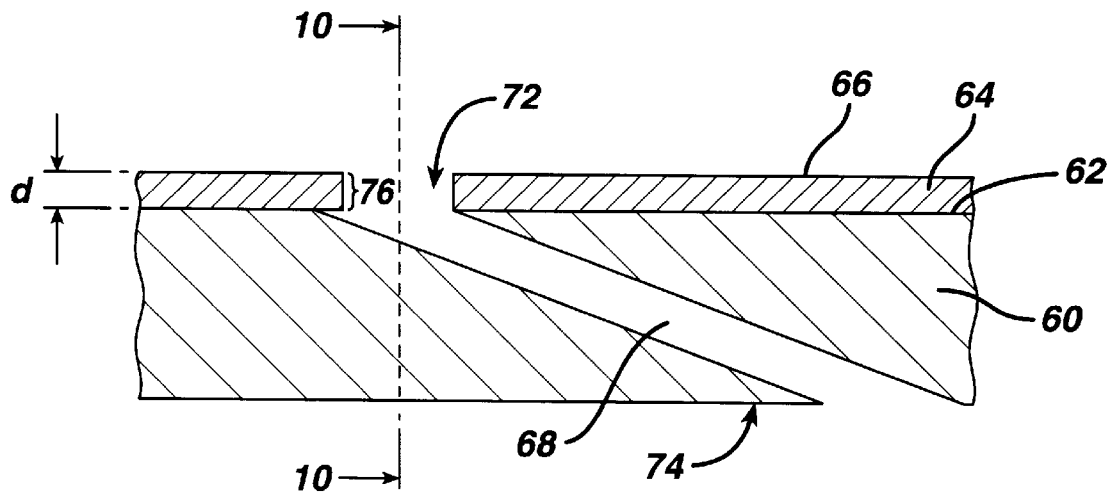
FIG. 9 is a partial cross-sectional view of a portion of a coated substrate based on another embodiment of the present invention.
Figure 10:
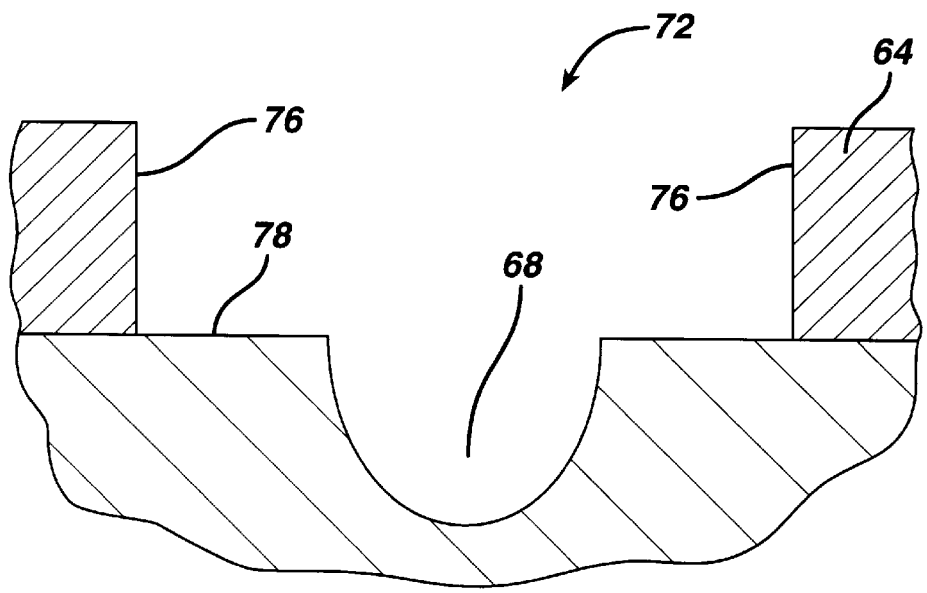
FIG. 10 is a view of figure 9 through lines 10—10.

FIG. 9 depicts one, non-limiting example of this embodiment, in which top layer 64 lies over the hot surface 62 of substrate 60. Layer 64 includes an opening or "crater" which serves as the exit site 72 of passage hole 68. FIG. 10 is a cross-sectional view of FIG. 9 through lines 10–10, further illustrating one possible shape for the exit site. Although this figure depicts the presence of horizontal ledge 78, the ledge may have a smaller length than shown, or may be omitted, if sidewall 76 is formed in a manner which permits it to be situated closer to the uppermost edge of passage hole 68.

The exit site 72 has a depth "d" (which in this embodiment is substantially identical to the height of sidewall 76) similar to that for previous embodiments, i.e., according to the dimensions set forth previously. Moreover, sidewall 76 need not be substantially perpendicular to surface 62 and ledge 78. As in the other embodiments, the sidewall could be inclined in one direction or the other relative to the perpendicular position, e.g., at an angle as low as about −60 degrees or as high as about +30 degrees relative to the perpendicular position, where a negative angle is defined as an inclination of the top of the sidewall inwardly toward the center of the crater, and a positive angle is of course an inclination in the opposite direction. Again, various coolant flow tests can be employed to determine the most appropriate position for the sidewall.

It should also be understood that in various embodiments of this invention, the exit site or crater may be aligned with the "upstream" edge of the passage hole (i.e., the edge closest to the coolant stream source), or the "downstream" edge of the passage hole. However, the crater does not have to be aligned with either edge, and can even extend beyond the edge of the passage hole. Coolant flow tests could again be used to determine the most appropriate configuration.

Layer 64 could be comprised of materials which would typically constitute a TBC (by itself), a bond coat (by itself) for the TBC, or a TBC applied over a bond coat. This two-coating structure is often referred to as a "TBC system". These types of materials are well-known in the art, and need not be described in great detail here. TBC systems protect metal-based substrates (or other types of substrates) and effectively raise the practical operating temperature of articles which incorporate those substrates, like aircraft engines. The bond layer for a metal substrate, which is often very important for improving the adhesion between the substrate and the TBC, is usually formed from a material like "MCrAlY", where "M" represents a metal like iron, nickel, or cobalt. Very often, the bond coating may be applied by a variety of conventional techniques, such as PVD, plasma spray (e.g., air plasma), CVD, or combinations of plasma spray and CVD techniques.

The TBC itself for a metal-based substrate is often a zirconia-based material, as mentioned above, and is typically applied by a plasma spray technique or by electron beam physical vapor deposition (EB-PVD). As used herein, "zirconia-based" embraces ceramic materials which contain at least about 75% zirconia. Zirconia is a well-known compound for barrier coatings, and is described, for example, in Kirk-Othmer's *Encyclopedia of Chemical Technology*, 3rd Edition, V. 24, pp. 882–883 (1984). In preferred embodiments, the zirconia is chemically stabilized by being blended with a material such as yttrium oxide, calcium oxide, magnesium oxide, cerium oxide, scandium oxide, or mixtures of any of those materials. In one specific example, zirconia can be blended with about 1% by weight to about 20% by weight yttrium oxide (based on their combined weight), and preferably, from about 3%–10% yttrium oxide.

Details regarding various techniques for applying the bond coat and the TBC can be found, for example, in Kirk-Othmer's *Encyclopedia of Chemical Technology*, 3rd Edition, Vol. 15, (1981) and Vol. 20 (1982); in *Ullmann's Encyclopedia of Industrial Chemistry*, Fifth Edition; Volume A6, VCH Publisher (1986); in *Scientific American*, H. Herman, September 1988; and in U.S. Pat. No. 5,384,200, incorporated herein by reference. Thus, one of ordinary skill in the art: can easily become familiar with various process details which may be relevant, e.g., cleaning of the surface prior to deposition; grit blasting (or some other form of abrasion) to remove oxides and roughen the surface; substrate temperature; and plasma spray parameters (when employed), such as spray distances (gun-to-substrate); selection of the number of spray-passes; powder feed rate, torch power, plasma gas selection; angle of deposition; post-treatment of the applied coating (e.g., deburring); and the like.

When the substrate is a metal-based component of a gas turbine engine, the bond coat usually has a thickness in the range of about 1 mil to about 10 mils, and preferably, in the range of about 3 mils to about 7 mils, while the TBC itself has a thickness in the range of about 5 mils to about 100 mils, and preferably, in the range of about 10 mils to about 40 mils. Thus, when top layer 64 in the embodiments of FIGS. 9 and 10 is a TBC system, it will usually have dimensions within the combined ranges for the bond coat and the TBC. If either the bond coat or the TBC is used individually to form layer 64, each will be applied to a thickness in the range of that used for the two-part TBC system. As described previously, coolant flow behavior will dictate the most appropriate thickness of layer 64 (and consequently, the depth of exit site 72.)

The cooling passage holes can be formed in a top layer like layer 64 of FIG. 9 by a variety of techniques. Non-limiting examples include laser drilling of the holes, as well as conventional drilling and water jet drilling. When the top layer is formed of a synthetic or plastic-type material, the holes could sometimes be prepared by photolithographic techniques, e.g., patterning and etching.

In preferred embodiments, however, a hole and terminating exit site like that featured in FIG. 9 is formed by the general technique taught in U.S. patent application Ser. No. 08/758,328 of V. S. Venkataramani et al, filed Dec. 3, 1996 U.S. Pat. No. 08/758,328 now U.S. Pat. No. 5,903,647. The Venkataramani et al patent application is assigned to the same assignee, and its teachings are incorporated herein by reference. The primary objective of the invention disclosed in that patent application is to temporarily protect a passage hole in a substrate from being obstructed by coatings applied over the substrate. However, the use of some embodiments of that invention also results in an exit site for the passage hole which effectively disrupts the flow of a coolant stream, as required by the present invention.

According to the invention of Ser. No. 08/758,328, filed Dec. 3, 1996 now U.S. Pat. No. 5,902,647, hole 68 in FIG. 9 would first be filled and covered with a curable masking material, prior to the formation of layer 64. The masking material (maskant) would form a protrusion over the hole. After the maskant is cured, at least one coating is applied over the entire substrate and maskant, forming layer 64. As described in the referenced patent application, the coatings do not substantially adhere to the protrusion. This discovery represents a particularly advantageous characteristic, since the exposed protrusions and the underlying remainder of maskant are relatively easy to remove. Subsequent removal of the maskant uncovers the passage hole, allowing unobstructed coolant flow. Moreover, the geometry of exit site 72 after removal of the maskant results in the coolant stream contacting a greater area of the high-temperature surface (i.e., at this point, the top surface 66 of layer 64), as described in the present application.

Figure 11:
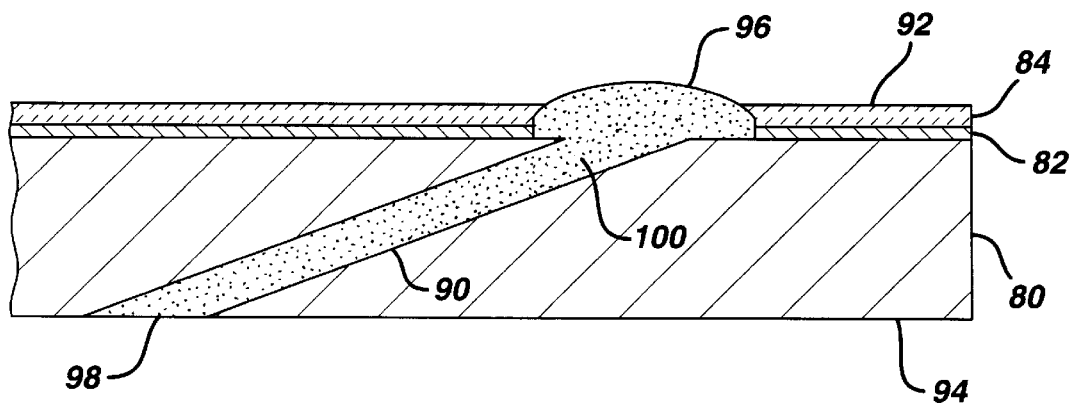
FIG. 11 is an exemplary, cross-sectional illustration of the placement of a masking material used in forming a desired exit site-geometry for a passage hole

FIG. 11 provides a cross-sectional illustration of the placement of a maskant for protecting a passage hole while also forming the necessary exit site-geometry of the present invention. The cured maskant 100 fills up and covers hole 90 which extends through substrate 80. In this particular embodiment, the substrate includes coating layers 82 and 84. In embodiments wherein the substrate is a turbine engine component, layers 82 and 84 are usually a bond coat and a TBC, as discussed previously. As shown in the figure, the maskant (or a precursor material) can be extruded through the hole from a hole entrance 98 on a cold surface 94, exiting the hole at hot surface 92, forming protrusion 96. The extrusion can be carried out by applying a layer of maskant material over cold surface 94, and then forming a pressure differential between the cold surface and hot surface 92, which will cause the maskant material to move through the hole and out to the hot surface. The maskant forms a protrusion on the hot surface, and the protrusion is often in the general shape of an elliptical dome.

Various other details regarding this method of protecting a passage hole and effectively forming the desired exit site geometry are set forth in the referenced application Ser. No. 08/758,328. Filed Dec. 3, 1996 now U.S. Pat. No. 5,902,647, and need not be dealt with in great detail here. Briefly, the maskant can comprise a wide variety of thermosetting or thermoplastic materials, such as epoxy resins, alkyd resins, phenolic resins, acrylic resins, thermoplastic polyesters, polyamides, polyolefins, styrene-based resins, and copolymers or mixtures of the thermoplastic materials. ("Curing" of the resin as the term is applied to thermoplastics refers generally to the cooling down and hardening of the material, as those skilled in the polymer arts understand.) The resins are usually used in conjunction with at least one filler, plasticizer, or liquid crystal material. The overall material exhibits a substantially non-Newtonian flow characteristic, e.g., a Bingham solid characteristic, which serves to ensure the formation of the protrusions.

After the desired coatings have been applied over the substrate, the maskant is removed to uncover the passage holes. As described in application Ser. No. 08/758,328, filed Dec. 3, 1996 now U.S. Pat. No. 5,902,647, removal can be effected by a variety of techniques, such as pyrolysis or the use of solvents. The resulting exit site geometry within the top layer coatings, as illustrated in FIGS. 9 and 10, improves the cooling effectiveness of a coolant stream which moves through the passage hole and along hot surface 64.

Figure 12:
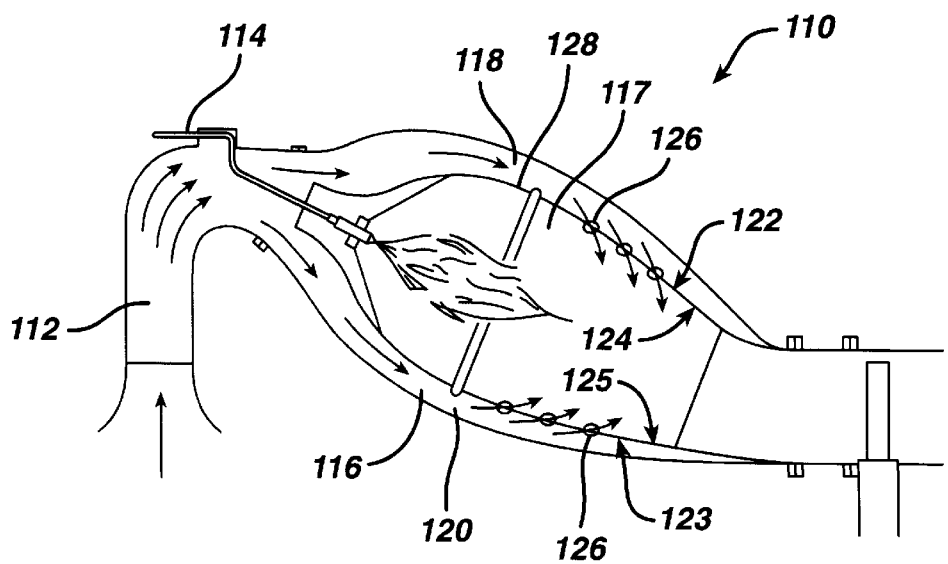
FIG. 12 is a general illustration of a section of a turbine engine incorporating an embodiment of the present invention.

FIG. 12 is a general illustration of a section 110 of one type of turbine engine which could incorporate the present invention. The components of this type of engine are well-known in the art. Air supplied from a compressor (not shown) moves through passage 112 and into combustion chamber 116. The main portion of the air is directed into combustion zone 117, along with fuel which originates at fuel source 114. The fuel and air are mixed and ignited in the combustion zone. At the same time, separate streams of air are directed through liner passageways 118 and 120, along the cold sides 122, 123 of the combustor liner. The coolant air stream enters combustion zone 117 through passage holes 126 in combustor liner 128, which represents a "substrate" in the context of the present invention. The coolant flow exits the substrate on the interior of the combustion zone, i.e., along the hot sides 124, 125 of the combustor liner. The geometry of the exit site of each of these passage holes is described in the previous figures. According to this invention, the disrupted coolant flow contacts a greater portion of hot sides 124, 125 than in those instances in which conventional passage holes are utilized. Greater cooling effectiveness of the combustor liner is thereby achieved.

As mentioned earlier, another embodiment of this invention is directed to an article, comprising:

a) a substrate; and b) at least one passage hole for a coolant stream extending through the substrate from a first surface to an exit site at a second surface which is selectively exposed to elevated temperature, wherein the passage hole has a substantially uniform cross-sectional area within the substrate, but has a different cross-sectional area at the exit site, suitable for disrupting the flow of the coolant stream. Other details regarding the article have already been discussed in detail, and are also illustrated in the figures.

The present invention is useful for modifying cooling channels in other types of engine components, e.g., turbine blades, vanes, and endwalls. Moreover, the invention could be utilized for modifying the flow of air or other gasses through passageways in any other type of structure.

EXAMPLES

These examples are merely illustrative, and should not be construed to be any sort of limitation on the scope of the claimed invention.

Example 1

Film cooling performance was measured for two metal-based substrates. Substrate A was aluminum, and had a thickness of about 400 mils. It included six passage holes having a length of about 1200 mils and a diameter of about 100 mils. The holes were spaced 6.5 hole-diameters apart. The were inclined at an angle of about 20 degrees relative to the top surface of the substrate, which will arbitrarily be referred to herein as the "hot surface". The passage holes had a conventional shape, i.e., there was no modification of hole shape.

Substrate B was also formed of aluminum. The main body of the substrate had the same thickness and the same types of passage holes (six of them) as substrate A. However, a plate containing six passage holes perpendicular to the plate surface was placed over the substrate, face-to-face. The plate had a thickness of 75 mils, and six of the circular holes in the, plate were aligned with passage holes in the main substrate. This resulted in the formation of a modified exit site for the passage holes, similar in geometry to that depicted in FIGS. 9–10. Water was used as the coolant for the flow tests. The characterization technique employed Planar Laser Induced Fluorescence (PLIF), which is described in pending provisional U.S. patent application Ser. No. 60/023,737 (RD-25,146PA) of Thomas F. Fric et al, filed on Aug. 8, 1996 expired, assigned to the assignee of the present invention, and incorporated herein by reference.

This technique provides a reliable measurement of "near-wall" fluid concentration, measuring the concentration of cooling fluid along the dimensions of a given surface. In brief, the orientation of a cooling model was first adjusted so that a light sheet (provided by a laser) was parallel to the cooling model. A test tunnel having a hot gas simulation flow and a cooling simulation flow (both water in this instance) was then uniformly filled with the water, which contained a fluorescent dye. The cooling simulation flow was passed through the passage holes of interest. For this example, the blowing ratio was varied from about 0.5 to 5.7.

An image of the resulting fluorescence was recorded. The system was then flushed, and the same concentration of dyed fluid was provided within the cooling simulation flow only. Again, an image of the resulting fluorescence was recorded. The cooling simulation flow image was then mathematically divided by the combined hot gas flow and cooling flow image, using a digital image processing system which allowed the measurement of both time average and instantaneous cooling fluid concentration at any location above the cooling model. The same technique was used for each substrate. Cooling performance was measured over six different blowing ratios. The Reynolds number (a non-dimensional flow parameter) of the air flowing through the cooling holes was about 1000. (The Reynolds number would increase as the blowing ratio is increased). The ratio of the coolant density to the mainstream density was approximately 1.0.

A scale from 0% to 100% was used to represent the range of cooling effectiveness. A value of 0% indicated that no cooling fluid was present at a given portion of the surface. The scale progressed to a value of 100%, with increasing percentages representing a greater concentration of cooling fluid at the surface of interest.

The measurements for substrate A (i.e., the conventional passage hole exit geometry outside the scope of the present invention) were taken over the following blowing ratios: 0.5, 0.8, 1.7, 3.3, 4.4, and 5.7. At a blowing ratio of 0.5, the cooling effectiveness was about 20%. As the blowing ratio was increased to 1.7, no improvement was seen in cooling effectiveness. In fact, it decreased to about 5%. Some improvement was evident at a blowing ratio of 3.3, but the cooling effectiveness still had not reached the level for a blowing ratio of 0.5. Further improvement was seen at the blowing ratios of 4.4 and 5.7, with average cooling effectiveness values in the approximate range of those for the 0.5 ratio. It appeared that, at the two highest blowing ratios, the coolant stream continued to separate from the hot surface, but the large flow of coolant caused some of the coolant to move back down to the surface and provide additional cooling protection. However, there are often serious drawbacks to the increase in blowing ratio which provided the additional protection. For example, in the case of an air coolant system for a turbine engine, the increase in blowing ratio decreases the amount of air available to flow into the pre-mixer in the combustion chamber. This in turn can increase the amount of pollutants produced during combustion.

As mentioned above, the same flow tests were performed for substrate B, which included six passage holes having a modified exit site geometry according to the present invention. At a blowing ratio of 0.5, immediate improvement was seen, as compared to substrate A. The average cooling effectiveness at 0.5 was in the range of about 30% to 40%, indicating that much more coolant was contacting the surface. The cooling effectiveness continued to increase as the blowing ratio was increased, reaching an average cooling effectiveness of about 50% at a blowing ratio of 1.7, indicating that much more of the surface was being beneficially affected by the coolant stream. Moreover, this increase in cooling effectiveness was achieved without resorting to the high blowing ratios of 3.3 to 5.7. Thus, the benefit is not gained at the expense of coolant intended for other locations, e.g., the pre-mixer of a combustor, as described above. (The cooling effectiveness at the blowing ratios of 3.3 to 5.7 was also greatly improved as compared to substrate A, with an average effectiveness value in the range of about 30% to 40%—still clearly exceeding the analogous values for substrate A).

Example 2

While the experiments performed in Example 1 are thought to provide a reliable prediction of cooling effectiveness in the case of air coolant (based on water coolant effectiveness), an additional experiment was undertaken, using air flow. Substrates C and D were formed of stainless steel, but were otherwise similar to those used in Example 1. The substrate thickness was 0.4 inch. Substrate C included five holes arranged in a row and having a conventional shape. Substrate D also included five holes in a row, but had a modified exit site geometry according to the present invention. The modification was achieved in the manner of substrate B in Example 1, i.e., with a plate situated on top of the main body of the substrate, having five circular plate holes aligned with the substrate holes. As in the case of substrate B, the crater (exit site) was aligned with the remainder of the passage hole as depicted in FIGS. 9 and 10.

In each instance, the substrate formed part of one wall of a small, metal wind tunnel. The distance between the holes was 6.5 hole diameters, and the cooling hole diameter in each instance was about 0.1 inch. For substrate D, the crater depth was 0.075 inch, while the crater diameter was 0.235 inch. The cooling holes were inclined at an angle of 20 degrees relative to the horizontal position.

Cool air (approximately room temperature and pressure) flowed through the cooling holes, while hot air (at approximately 600° F. (315° C.) and room pressure) flowed through the wind tunnel. The wall of the wind tunnel downstream of the cooling holes was insulated. It also was fitted with a multitude of thermocouples to measure wall temperature. The wall temperature (T) downstream of the cooling holes was designated as "cooling effectiveness", according to the following equation:

$$\text{Cooling effectiveness, "n"} = (T_{wall} - T_{mainstream})/(T_{cooling\ air} - T_{mainstream})$$

Higher effectiveness indicated better cooling. The ratio of the coolant density to the mainstream density was approximately 1.9, which is similar to that found in a turbine engine combustion zone. The Reynolds number of the air flowing through the cooling holes was also close to that found in the combustion zone of a combustor, i.e., about 10,000.

Figure 13:
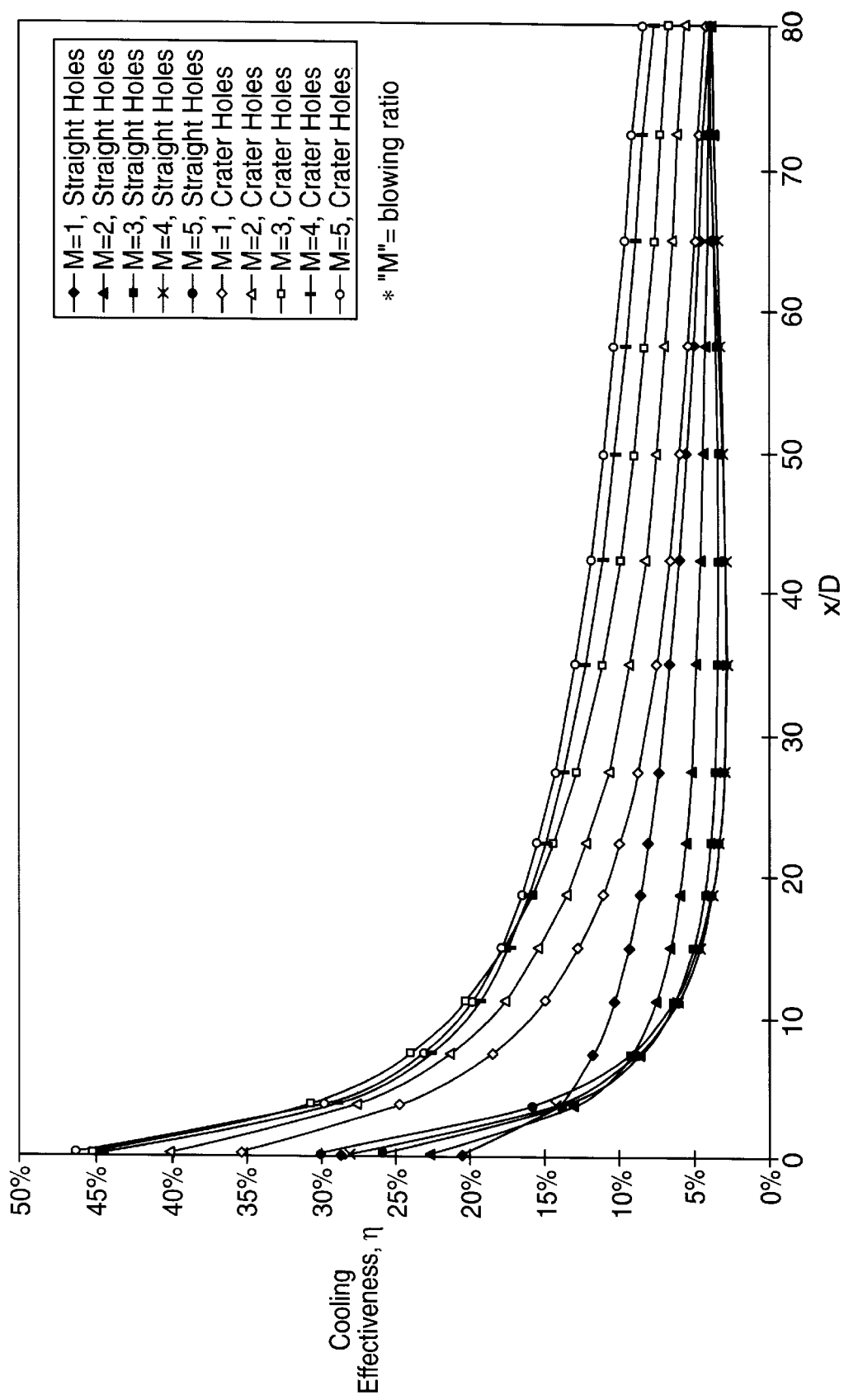
FIG. 13 is a graphical illustration comparing the cooling effectiveness in the presence and in the absence of the present invention.

Five different blowing ratios (designated by "M") were examined for both substrate C and substrate D. The results of this test are provided in FIG. 13. The figure depicts cooling effectiveness on the y-axis, as a function of the distance downstream (the x-axis, in hole diameter-units) of the edge of the cooling holes. The effectiveness is being measured along the surface being cooled and along the center-line of the middle hole of the row, in the direction of the mainstream flow along the surface. Clearly, cooling effectiveness is greatly enhanced with the modified passage holes of the present invention. For example, in the case of a blowing ratio of 1, higher effectiveness values are seen along the entire surface. At the greater distances along the surface, e.g., an x/D value of about 60–80, the differences between the cooling values for substrates C and D are less pronounced (although still significant). This appears to be due to the coolant stream at those distances diffusing into the hot gasses and thereby becoming somewhat less effective. (It is well-established in the art that film cooling is a beneficial technique in the region generally near the holes)

The differences between cooling effectiveness at the other blowing ratio's are generally even more pronounced than at the blowing ratio of 1. Thus, improved cooling effectiveness downstream has been demonstrated. This result occurred, even though the density ratios and Reynolds numbers were higher than in Example 1.

Example 3

In this example, film cooling performance was measured for a substrate in which the exit site geometry was modified by the use of a thermal barrier coating (TBC). The comparative sample is the substrate prior to application of the TBC. It will be designated as sample E, while the TBC-covered substrate will be designated as sample F. The substrate was a nickel-based superalloy, and had a thickness of about 80 mils. The substrate was a 3 inch×3 inch square array of 371 holes, formed by laser drilling. The length of the holes was about 240 mils, and the hole diameter was about 22 mils. The holes were spaced 5.9 hole-diameters apart, and were inclined at an angle of about 20 degrees relative to the top surface of the substrate, which will arbitrarily be referred to herein as the "hot surface". The passage holes, prior to application of the TBC system, had a conventional shape, i.e., without any modification.

The exit site geometry for the passage holes of sample F was formed according to the process described above for application Ser. No. 08/758,328. Filed Dec. 3, 1996 now U.S. Pat. No. 5,902,647. Here, a 2-part epoxy material was extruded through the holes from the upstream side of the substrate (i.e., the surface opposite the hot surface, and sometimes referred to as the "cold" surface), forming the protrusion on the hot surface, similar to that depicted in FIG. 11. After the surface was grit-blasted, a bond coat layer formed of NiCrAlY was applied by air-plasma spray, to ad thickness of 5 mils. A TBC based on yttria-stabilized zirconia was then also applied by air-plasma spray, to a thickness of 10 mils. The epoxy material was then removed pyrolytically in an oven at elevated temperature. The resulting exit site for the passage holes included a crater somewhat oval in shape, having a penetration area width of 58 mils, and a crater area-diameter i.e., the TBC opening, perpendicular to the stream-wise direction) of 47 mils. The sidewalls of the exit site were somewhat curved and uneven, as would be the case when the masking material in the structure of FIG. 11 is removed.

Cooling effectiveness was measured (before and after application of the TBC system) by the PLIF technique described for Example 1, wherein the cooling simulation flow was passed through the passage holes of interest. Water was used as the coolant. For this example, a blowing ratio having a value (M) of 4 was tested, which is representative of combustion liner conditions.

Figure 14:
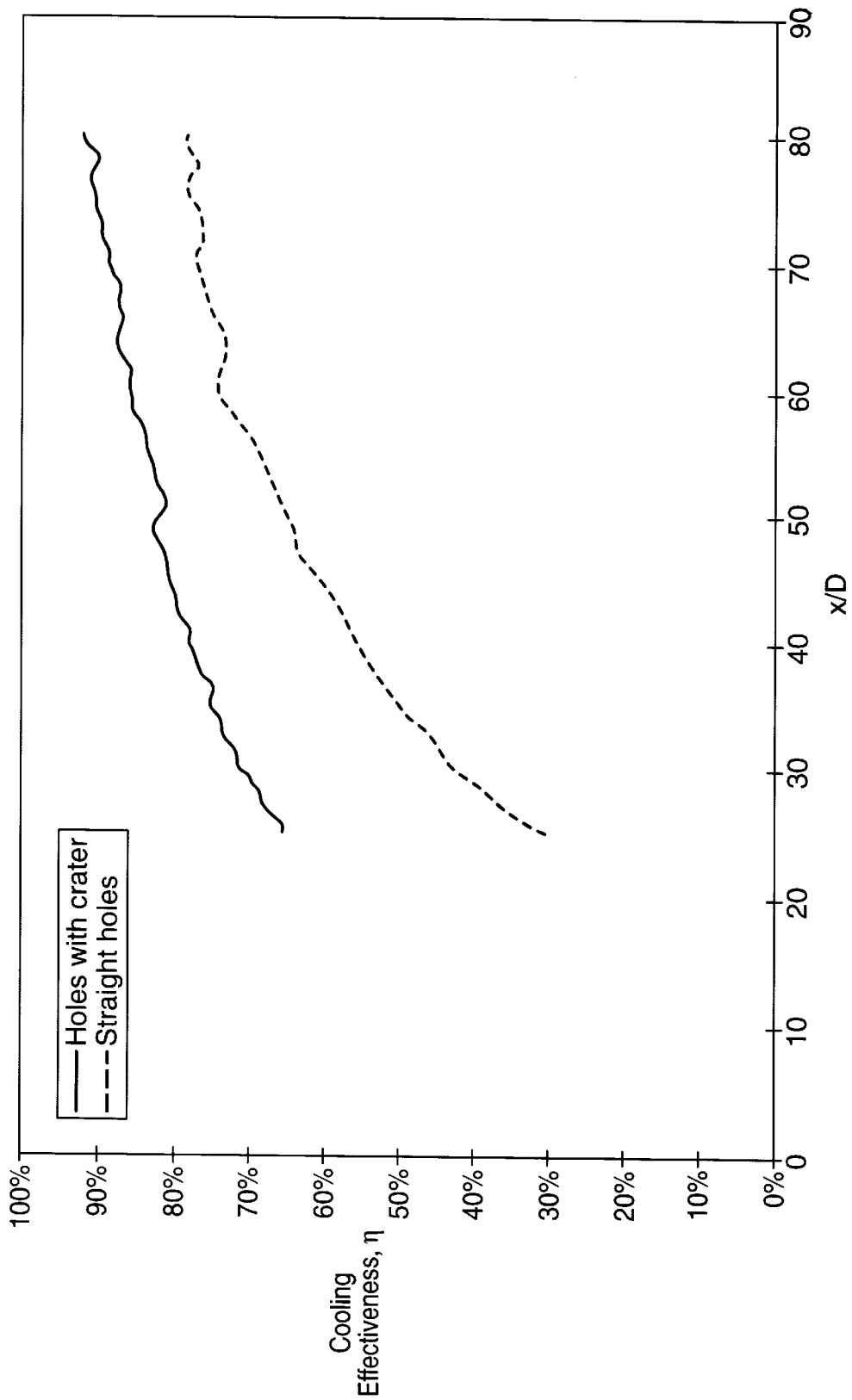
FIG. 14 is a graphical illustration comparing the cooling effectiveness in the presence and in the absence of the present invention, according to another embodiment.

FIG. 14 is based on the results for these tests, and represents cooling effectiveness as a function of stream-wise position. Two curves are represented in the figure, representing samples E and F at the blowing ratio of 4. The y-axis represents film cooling effectiveness, and the x-axis represents the x/D distance within the large array of passage holes, wherein the value of 0 for x/D is the first row of holes. (The testing technique permitted the generation of data on the central-portion of the array.). Unlike the situation with a single row of holes, each row of holes in a large array involves the further addition of coolant stream material, and the cooling effectiveness values are increased with downstream progression (in contrast to Examples 1 and 2). A large increase in cooling effectiveness for the sample with the modified exit hole geometry was again evident, with as much as a two-fold improvement.

While preferred embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the claimed inventive concept.

All of the patents, patent applications (including provisional applications), articles, and texts which are mentioned above are incorporated herein by reference.

What is claimed:

1. A method for improving the cooling effectiveness of a gaseous coolant stream which flows through at least one passage hole in a substrate to an exit site on a high-temperature surface of the substrate, said passage hole being inclined at an angle in the range of about 10 degrees to about 60 degrees, relative to the surface of the substrate, and said exit site having a depth which is less than the length of the passage hole, wherein said method comprises disrupting the coolant stream at the exit site, so that the coolant stream contacts a greater area of the high-temperature surface.

2. The method of claim 1, wherein the passage hole has a substantially uniform cross-sectional area within the substrate, but has a different cross-sectional area at the exit site.

3. The method of claim 2, wherein the cross-sectional area at the exit site is greater than the cross-sectional area within the substrate.

4. The method of claim 2, wherein the depth of the exit site is in the range of about 10% to about 500% of the diameter of the hole within the substrate, and the planar area of the exit site is in the range of about 50% to about 600% of the cross-sectional area of the hole within the substrate.

5. The method of claim 4, wherein the depth of the exit site is in the range of about 20% to about 100% of the diameter of the hole within the substrate, and the planar area of the exit site is in the range of about 200% to about 400% of the cross-sectional area of the hole within the substrate.

6. The method of claim 2, wherein the exit site is a crater having sidewalls substantially vertical to the substrate surface, and having an open base which communicates with the remainder of the passage hole within the substrate.

7. The method of claim 6, wherein the depth of the crater is in the range of about 5 mils to about 100 mils.

8. The method of claim 1, wherein the substrate comprises a row of holes.

9. The method of claim 1, wherein the substrate comprises an array of holes.

10. The method of claim 9, wherein the holes are inclined at an angle in the range of about 10 degrees to about 60 degrees, relative to the surface of the substrate.

11. The method of claim 1, wherein the hole is inclined at an angle in the range of about 20 degrees to about 45 degrees, relative to the surface of the substrate.

12. The method of claim 1, wherein the substrate is covered by at least one coating through which the passage holes communicate.

13. The method of claim 1, wherein the substrate is formed of a material selected from the group consisting of ceramics and metal-based materials.

14. The method of claim 1, wherein the substrate is a component of a gas turbine engine.

15. The method of claim 14, wherein the component is a liner wall of a combustion chamber, and the coolant stream flows from a lower-temperature surface, through the liner, to the exit site at the high-temperature surface.

16. The method of claim 14, wherein the substrate comprises a superalloy.

17. The method of claim 14, wherein the substrate is covered by a thermal barrier coating, through which the passage hole communicates.

18. The method of claim 15, wherein the high-temperature surface is exposed to a hot gas stream having a temperature of at least about 1000° C.

19. The method of claim 14, wherein the blowing ratio of the coolant stream to the hot gas stream is in the range of about 0.5 to about 6.

20. The method of claim 1, wherein at least one coating is applied over the substrate, and the exit site is contained within the coating.

21. The method of claim 20, wherein the passage hole has a substantially uniform cross-sectional area within the substrate, but has a different cross-sectional area at the exit site.

22. The method of claim 21, wherein the depth of the exit site is in the range of about 10% to about 500% of the diameter of the hole within the substrate, and the planar area of the exit site is in the range of about 50% to about 600% of the cross-sectional area of the hole within the substrate.

23. The method of claim 21, wherein the exit site is a crater, having an open base which communicates with the remainder of the passage hole within the substrate.

24. The, method of claim 21, wherein the coating comprises a thermal barrier coating.

25. The method of claim 21, wherein the coating comprises a bond coat for a thermal barrier coating.

26. The method of claim 21, wherein the coating comprises a thermal barrier coating applied over a bond coat which is in turn applied over the substrate.

27. The method of claim 21, wherein the exit site is formed by a technique comprising the following steps:

(a) filling and covering the hole with a curable masking material which forms a protrusion over the hole;

(b) curing the masking material;

(c) applying the coating over the substrate and the masking material, wherein the coating does not substantially adhere to the protrusion; and then (d) removing the masking material to uncover the passage hole and the exit site.

28. The method of claim 1, wherein the concentration of gaseous coolant adjacent the high temperature surface is increased by a multiplicative factor of at least about 1.1, as compared to the cooling effectiveness of a coolant stream in which the stream is not disrupted.

29. The method of claim 28, wherein the concentration of gaseous coolant adjacent the high temperature surface is increased by a multiplicative factor of at least about 1.5, as compared to the cooling effectiveness of a coolant stream in which the stream is not disrupted.

30. An article, comprising:

a) a substrate; and b) at least one passage hole for a coolant stream extending through the substrate from a first surface to an exit site at a second surface which is selectively exposed to elevated temperature, wherein the passage hole is inclined at an angle in the range of about 10 degrees to about 60 degrees, relative to the surface of the substrate, said exit site having a depth which is less than the length of the passage hole, and wherein the passage hole has a substantially uniform cross-sectional area within the substrate, but has a different cross-sectional area at the exit site, suitable for disrupting the flow of the coolant stream.

31. The article of claim 30, wherein the passage hole has a substantially uniform cross-sectional area within the substrate, but has a larger cross-sectional area at the exit site.

32. The article of claim 31, wherein the exit site is a crater having an open base which communicates with the remainder of the passage hole within the substrate.

33. The article of claim 30, wherein the depth of the exit site is in the range of about 10% to about 500% of the diameter of the hole within the substrate, and the planar area of the exit site is in the range of about 50% to about 600% of the cross-sectional area of the hole within the substrate.

34. The article of claim 33, wherein the depth of the exit site is in the range of about 20% to about 100% of the diameter of the hole within the substrate, and the planar area of the exit site is in the range of about 200% to about 400% of the cross-sectional area of the hole within the substrate.

35. The article of claim 30, wherein at least one coating is applied over the substrate, and the exit site is contained within the coating.

36. The article of claim 35, wherein the coating comprises a thermal barrier coating.

37. The article of claim 35, wherein the coating comprises a bond coat for a thermal barrier coating.

38. The article of claim 35, wherein the coating comprises a thermal barrier coating applied over a bond coat which is in turn applied over the substrate.

39. The article of claim 30, wherein the substrate comprises an array of holes.

40. The article of claim 30, wherein the substrate is formed from a material selected from the group consisting of metal-based materials and ceramics.

41. The article of claim 30, wherein the substrate is a component of a gas turbine engine.

42. The article of claim 41, wherein the substrate is formed from a superalloy material.

43. The method of claim 1, wherein the exit site has a depth which is less than about 50% of the length of the passage hole.

44. The method of claim 1, wherein the axis of the passage hole is out of alignment with the axis of the exit site.

45. The method of claim 44, wherein the angle between the axis of the passage hole and the axis of the exit site is at least about 20 degrees.

46. The article of claim 30, wherein the exit site has a depth which is less than about 50% of the length of the passage hole.

47. The article of claim 30, wherein the axis of the passage hole is out of alignment with the axis of the exit site.

48. The article of claim 47, wherein the angle between the axis of the passage hole and the axis of the exit site is at least about 20 degrees.

* * * * *